US009933543B2

(12) United States Patent
Sethi et al.

(10) Patent No.: US 9,933,543 B2
(45) Date of Patent: Apr. 3, 2018

(54) DOWNHOLE INSPECTION, DETECTION, AND IMAGING USING CONFORMABLE SENSORS

(71) Applicant: Halliburton Energy Services, Inc., Houston, TX (US)

(72) Inventors: Neeraj Sethi, Gurgaon (IN); Jim Taylor Hill, Kingwood, TX (US); Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/915,879

(22) PCT Filed: Sep. 30, 2014

(86) PCT No.: PCT/US2014/058171
§ 371 (c)(1),
(2) Date: Mar. 1, 2016

(87) PCT Pub. No.: WO2015/050836
PCT Pub. Date: Apr. 9, 2015

(65) Prior Publication Data

US 2016/0195635 A1 Jul. 7, 2016

(30) Foreign Application Priority Data

Oct. 3, 2013 (IN) ........................... 2934/DEL/2013

(51) Int. Cl.
*G01V 3/00* (2006.01)
*G01V 3/38* (2006.01)
(Continued)

(52) U.S. Cl.
CPC ............ *G01V 3/38* (2013.01); *E21B 47/0002* (2013.01); *G01V 3/30* (2013.01)

(58) Field of Classification Search
CPC . G01V 1/48; G01V 1/50; G01V 1/368; G01V 3/30; G01V 3/38; G01V 3/18;
(Continued)

(56) References Cited

U.S. PATENT DOCUMENTS 4,292,588 A 9/1981 Smith
4,292,589 A 9/1981 Bonner
(Continued)

OTHER PUBLICATIONS

International Preliminary Report on Patentability issued in related Application No. PCT/US2014/058171, dated Apr. 14, 2016 (13 pages).

(Continued)

*Primary Examiner* — Minh N Tang
(74) *Attorney, Agent, or Firm* — Scott Richardson; Baker Botts L.L.P.

(57) ABSTRACT

An example method for downhole surveying and measuring may include receiving a measurement from a receiver of a conformable sensor, the measurement corresponding to a response of a downhole element to an electromagnetic signal generated by a transmitter of the conformable sensor. A parameter of the downhole element may be determined based, at least in part, on the received measurement. A visualization of a feature of the downhole element may be generated based, at least in part, on at least one of the received measurement and the determined parameter.

20 Claims, 8 Drawing Sheets

(51) Int. Cl.
*G01V 3/30* (2006.01)
*E21B 47/00* (2012.01)

(58) Field of Classification Search
CPC .......... G01V 3/26; G01V 3/28; G01N 27/902; G01N 27/904; G01N 27/9046; E21B 47/0006; E21B 47/00; E21B 47/0002; E21B 47/18; E21B 47/082
See application file for complete search history.

(56) References Cited

U.S. PATENT DOCUMENTS

| | | | | |
|---|---|---|---|---|
| 4,468,623 | A * | 8/1984 | Gianzero | G01V 3/20 324/355 |
| 5,869,767 | A | 2/1999 | Hayward et al. | |
| 7,420,367 | B2 * | 9/2008 | Bespalov | E21B 47/0002 324/303 |
| 2002/0167418 | A1 | 11/2002 | Goswami et al. | |
| 2010/0097066 | A1 | 4/2010 | Gao | |

OTHER PUBLICATIONS

International Search Report and Written Opinion issued in related PCT Application No. PCT/US2014/058171 dated Jan. 8, 2015, 16 pages.

Goldfine, Neil, "Surface-Mounted Eddy-Current Sensors for On-Line Monitoring of Fatigue Tests and for Aircraft Health Monitoring", Second Joint NASA/FAA/DoD Conference on Aging Aircraft, Aug. 1998.

Goldfine, Neil, et al, "Conformable Eddy-Current Sensors and Arrays for Fleetwide Gas Turbine Component Quality Assesment", ASME Journal of Engineering for Gas Turbines and Power, vol. 124, No. 4, pp. 904-909, Oct. 2002.

Goldfine, Neil, "MWM-Array Eddy Current Sensors for Detection of Cracks in Regions with Fretting Damage", Material Evaluation, ASNT, Jul. 2002, vol. 60, No. 7.

* cited by examiner

DOWNHOLE INSPECTION, DETECTION, AND IMAGING USING CONFORMABLE SENSORS

CROSS REFERENCE TO RELATED APPLICATIONS

The present application is a U.S. National Stage Application of International Application No. PCT/US2014/058171 filed Sep. 30, 2014, and claims priority to Indian provisional number 2934/DEL/2013, filed Oct. 3, 2013, titled "DOWNHOLE INSPECTION, DETECTION, AND IMAGING USING CONFORMABLE SENSORS," both of which are incorporated herein by reference in their entirety for all purposes.

BACKGROUND

The present disclosure relates generally to downhole drilling operations and, more particularly, to downhole inspection, detection, and imaging using conformable sensors. Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a wellbore at a desired well site, treating the wellbore to optimize production of hydrocarbons, and performing the necessary steps to produce and process the hydrocarbons from the subterranean formation. In certain operations, measurements of downhole elements within the wellbore may be generated, including measurements of a casing within the wellbore. Typically, those measurements are limited with respect to their granularity, and small features within the wellbore may not be identifiable through the measurements. Moreover, the casing can interfere with measurements intended to identify elements outside of the casing.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features.

Figure 1:
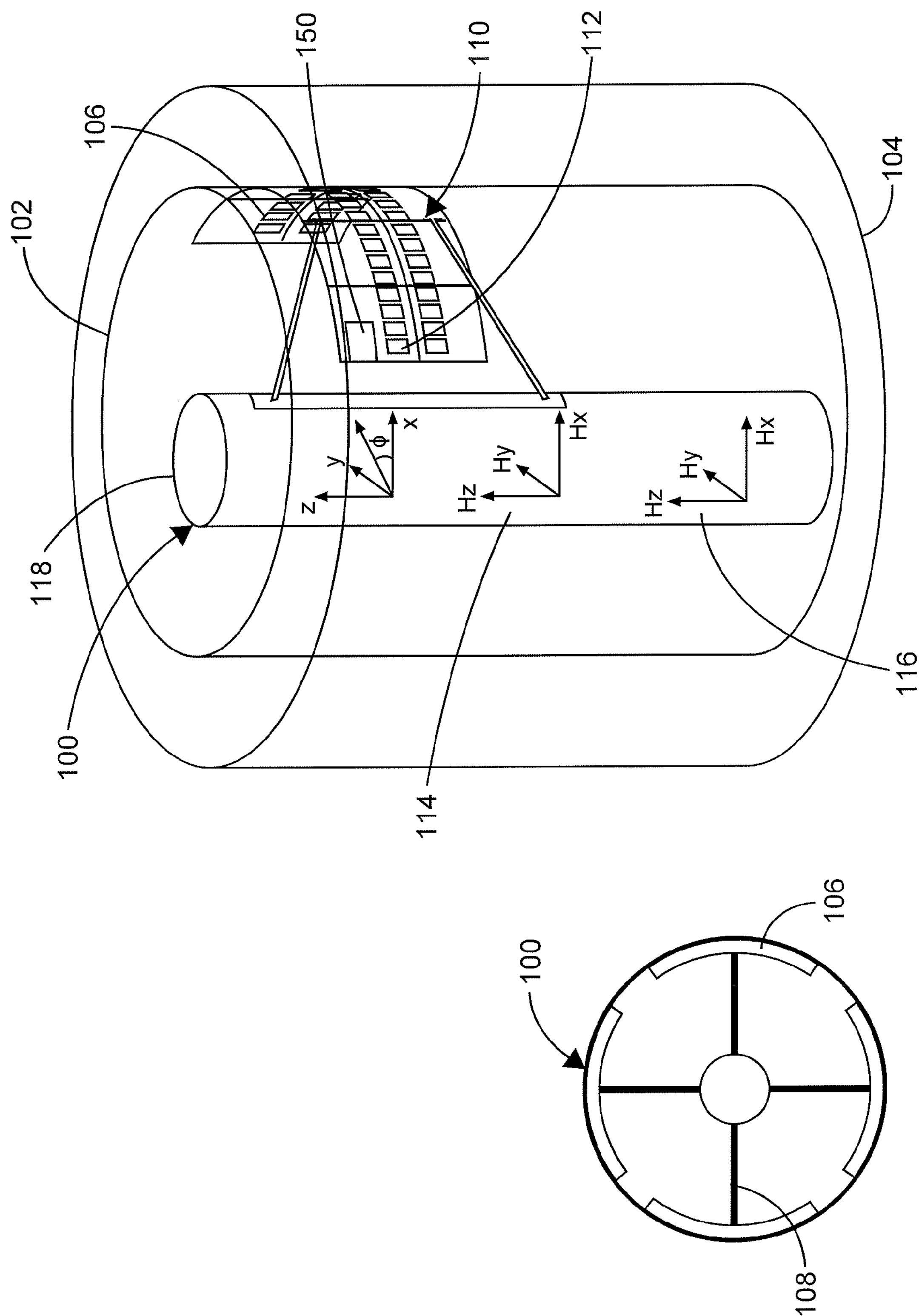
FIG. 1 is a diagram showing an example downhole tool with conformable sensors, according to aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to downhole drilling operations and, more particularly, to downhole inspection, detection, and imaging using conformable eddy-current sensors.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. It may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Illustrative embodiments of the present disclosure are described in detail herein. In the interest of clarity, not all features of an actual implementation may be described in this specification. It will of course be appreciated that in the development of any such actual embodiment, numerous implementation-specific decisions are made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like.

The terms "couple," "coupled," and "couples" as used herein are intended to mean either an indirect or a direct connection. Thus, if a first device couples to a second device, that connection may be through a direct connection or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

Modern petroleum drilling and production operations demand information relating to parameters and conditions downhole. Several methods exist for downhole information collection, including logging-while-drilling ("LWD") and measurement-while-drilling ("MWD"). In LWD, data is typically collected during the drilling process, thereby avoiding any need to remove the drilling assembly to insert a wireline logging tool. LWD consequently allows the driller to make accurate real-time modifications or corrections to optimize performance while minimizing down time. MWD is the term for measuring conditions downhole concerning the movement and location of the drilling assembly while the drilling continues. LWD concentrates more on formation parameter measurement. While distinctions between MWD and LWD may exist, the terms MWD and LWD often are used interchangeably. For the purposes of this disclosure, the term LWD will be used with the understanding that this term encompasses both the collection of formation parameters and the collection of information relating to the movement and position of the drilling assembly.

Figure 8:
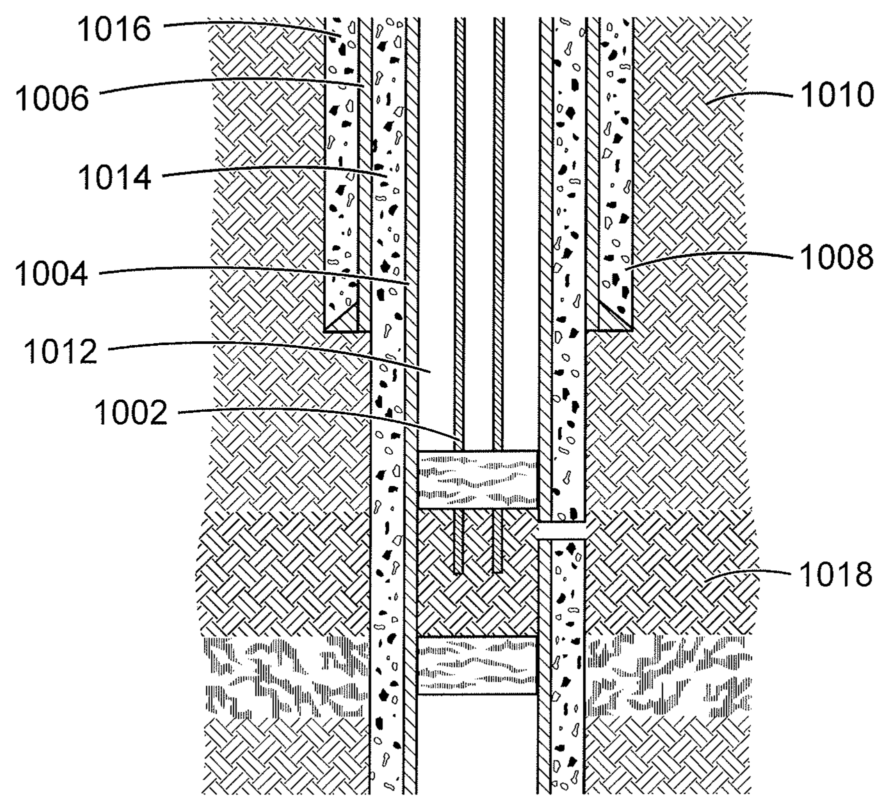
FIG. 8 is a diagram showing an example production environment with multiple, concentric casings.

Hydrocarbons may be trapped in porous rock formations thousands of feet below the surface. Recovering the hydrocarbons typically requires drilling a borehole into the porous rock formation so that the hydrocarbons may be pumped to the surface. Metal pipes, referred to as casings, may be secured within the borehole as part of the hydrocarbon recovery operation. FIG. 8 is a diagram showing an example production environment and illustrates casings 1002, 1004, and 1006 disposed within a borehole 1008 in a rock formation 1010. The casings 1002-1004 may be concentric or nearly concentric and secured within the borehole 1008 and each other through cement layers 1012, 1014, and 1016. The center casing 1002 may comprise a production casing where hydrocarbon from the formation strata 1018 is received at the surface (not shown).

The casings 1002-1006 may serve numerous purposes within a production and drilling environment, including preventing the borehole 1008 from collapsing after it is drilled and/or while it is being drilling, protecting a water table in the formation 1010 from contamination, and/or maintaining pressure within the borehole 1008. Accordingly, damage to the integrity of the casings 1002-1006 may compromise these purposes and/or otherwise interfere with drilling operations and/or production of the well. Common damage to the casings includes crack and corrosion, which can be an indication of a defective cement bond between a casing and the borehole wall. Downhole measurements may be used to survey the casings 102-106 to identify damage.

According to aspects of the present disclosure, a downhole tool with at least one conformable sensor may be proximate to downhole elements in either an open hole (non-cased) environment, or in a cased environment. As used herein, conformable sensors may comprise planar sensors that are printed or disposed on a material that can conform to the shape of a surface with which it is in contact, and may produce high resolution, azimuthally sensitive measurements that can be used to visualize that surface. Example downhole elements include the borehole, formation, and pipe or casing disposed within the borehole.

The downhole tool with conformable sensors may be used to inspect, detect, and visualize features of the borehole and casing with a high degree of azimuthal accuracy. In a cased environment, the downhole tool may comprise a wireline tool and the conformable sensor may be used to identify features such as fractures or corrosion within the casing that may threaten the integrity of the well. The azimuthal resolution provided by the conformable sensors may allow accurate identification of fractures and corrosion with a small profile. In an open hole environment, the downhole tool may comprise a wireline tool and LWD/MWD system and the conformable sensor may be used to identify features such as fractures proximate the borehole in a formation surrounding the borehole.

FIG. 1 is a diagram that shows two views of an example downhole tool 100 with at least one conformable sensor 112, according to aspects of the present disclosure. The downhole tool 100 is shown deployed in concentric pipes 102 and 104, such as in a cased environment. In certain embodiments, the downhole tool 100 may comprise a wireline survey or measurement tool that can be introduced into an open hole (non-cased) environment, a cased environment, or within the bore of a drill string in a conventional drilling assembly. In certain embodiments, the downhole tool 100 may be included in a LWD/MWD segment of a bottom hole assembly (BHA) in a conventional drilling assembly. The tool 100 may be physically and/or communicably coupled to a control unit (not shown) at the surface through a wireline or slickline, or any other conveyance, or through a downhole telemetry system, such as a mud pulse telemetry system. The tool 100 may also comprise a control unit that is communicably coupled to the conformable sensor 112 of the tool. As used herein, a control unit may include an information handling system or any other device that contains at least one processor communicably coupled to a non-transitory computer readable memory device containing a set of instructions that when executed by the processor, cause it to perform certain actions. Example processors include microprocessors, microcontrollers, digital signal processors (DSP), application specific integrated circuits (ASIC), or any other digital or analog circuitry configured to interpret and/or execute program instructions and/or process data.

At least one conformable sensor 112 may be coupled to a tool body 118 of the downhole tool 100. The conformable sensor 112 may include a primary winding having extended portions for creating an electromagnetic (EM) field in a target, in this case the pipe 102, and secondary windings within the primary winding for measuring the current response of the target to the generated EM field. The measured current response may be processed to identify physical parameters of the target, as will be described below. The resolution of the measurements taken by the conformable sensor 112 may increase as the “stand-off” distance between the sensor 112 and the target decreases.

In the embodiment shown, the conformable sensor 112 is one of an array of conformable sensors disposed on a pad 106 that is coupled to and extendable from the tool body 118 through spring mechanisms or motorized arms 108 to contact the pipe 102. Other locations and arrangements for the conformable sensor 112 are possible and will be described below. Other types of sensors, such as acoustic sensor 150, may be coupled to the pad 106. The spring mechanisms or motorized arms 108 may similarly establish contact between the pad 106 and a borehole wall in an open hole environment. The elasticity of the pad 106 and tension in the arm 108 may be designed in such a way that the pad 106 will substantially deform to the shape of the pipe 102 and which may increase the resolution of the resulting measurements. Other pads similar to pad 106 may be arranged on different sides of the tool 100 to mechanically balance the tool 100 within the pipe 102. In other embodiments, expandable arms may be used opposite the pad 106 to mechanically balance the tool 100. In certain embodiments, the array 110 of conformable sensors may be arranged on the pad 106 to perform sensing at different azimuthal positions with respect to the tool body 118. In embodiments where multiple pads are used, each pad may include an array of conformable sensors to perform sensing at different azimuthal positions, and the pads may be arranged with respect to the tool body 118 such that there is full 360 degree coverage around the tool 100, where one pad covers one set of angles, and/or other stations cover other sets, providing full coverage.

As stated above, the conformable sensor 112 may include at least one portion that functions as a transmitter to generate electromagnetic (EM) fields in a target, such as the pipe 102, and at least one portion that functions as a receiver that receives and/or measures the current responses of the target to the generated EM fields. In certain embodiments, the downhole tool 100 may comprise separate transmitters 114 or receivers 116 mounted on the tool body 118. These additional transmitters 114 or receivers 116 may be inductive-type antennas, realized with coils, solenoids, or rotating and/or moving magnets. In certain embodiments, EM fields may be generated and the corresponding current responses measured with any combination of the measurements may be taken with any combination of the transmitter 114, the receiver 112, and the transmitters and receivers within the conformable sensor 112. Notably, when the transmitter is farther away from the receiver, the depth of investigation may increase but the measurement resolution may decrease.

In use, the downhole tool 100 may generate high resolution measurements of the pipe 102 or other target by placing the pad 106 in contact with the pipe 102 and transmitting a time-varying electromagnetic signal from a transmitter of the conformable sensor 112. The signal may generate eddy currents in the features of the pipe 102, including corrosion and cracks on the pipe 102. The eddy currents may generate secondary currents that contain information about the features of the pipe 102, and the secondary currents may be measured at some or all of the receivers of the conformable sensor 112. Conversely, the downhole tool 100 may generate low resolution measurements of the pipe 104 by transmitting a time-varying electromagnetic signal from transmitter 114 and measuring the current response of the pipe 104 at one or more receivers of the conformable sensor 112.

Figure 2:
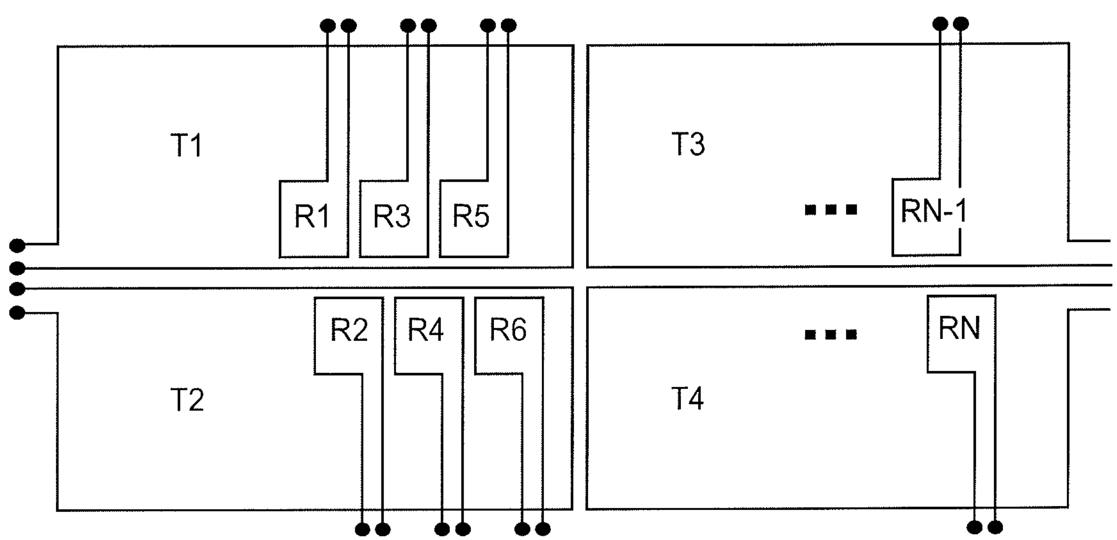
FIG. 2 is a diagram showing example antenna windings for a conformable sensor, according to aspects of the present disclosure.
Figure 3:
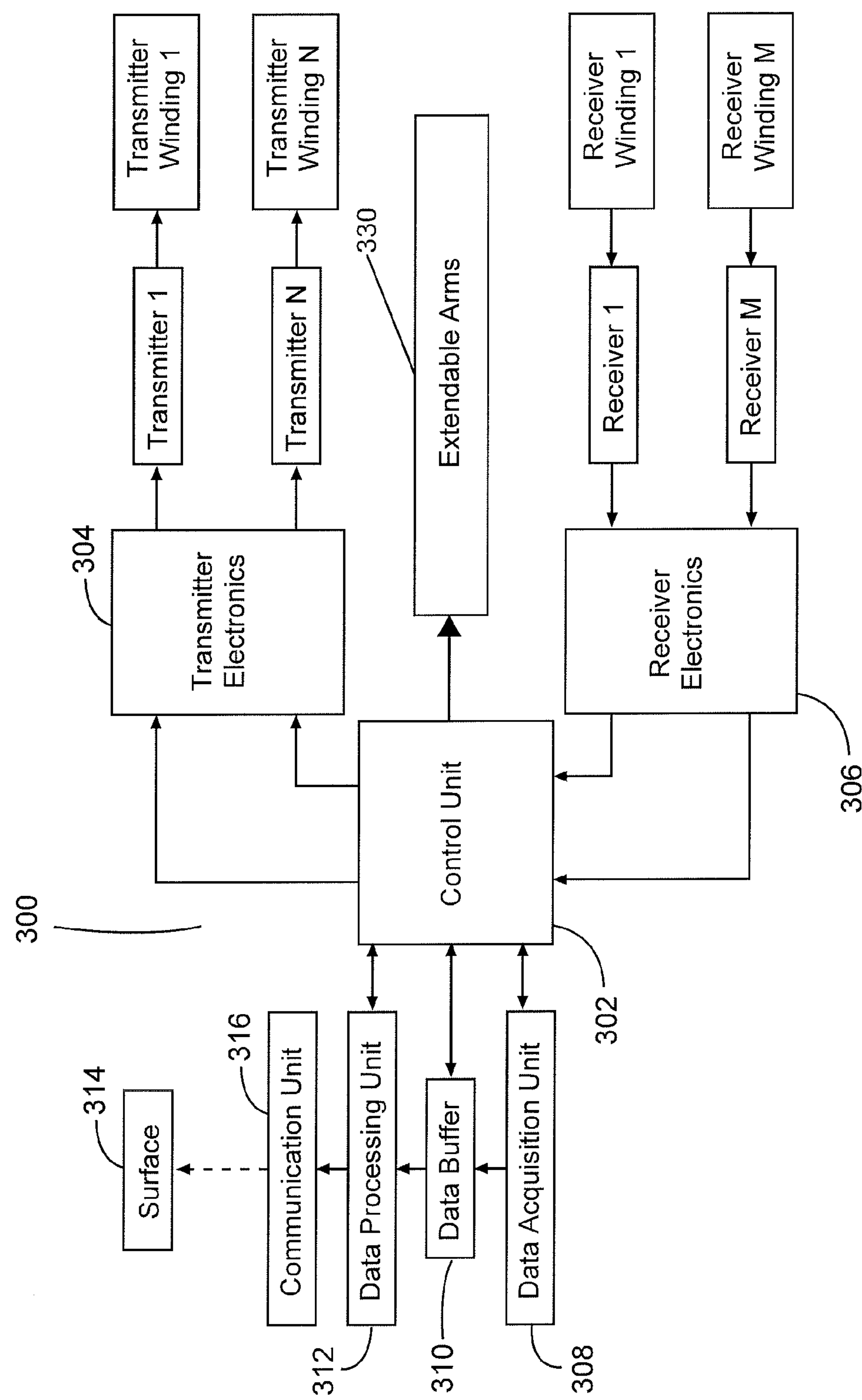
FIG. 3 is a diagram showing an example control system for a downhole tool with conformable sensor array, according to aspects of the present disclosure.

FIG. 2 is a diagram showing example antenna windings for a conformable sensor, according to aspects of the present disclosure. The windings shown may comprise the windings for a single conformable sensor and may be formed by circuit printing or other deposition methods on a flexible surface (not shown). As can be seen, the windings include transmitters T1-T4 and staggered receivers R1-RN. The transmitters T1-T4 may comprise primary windings, while the staggered receivers R1-RN may comprise secondary windings. The number and size of the receiver pairs may determine the granularity and resolution of the measurements. Staggering the receivers may double the azimuthal resolution of the sensor since more measurements are made per azimuthal position. Although one example of antenna windings for a conformable sensor is shown in FIG. 2, other configurations are possible. For example, the size and relative positions of the transmitters T1-T4 and receivers R1-RN may be altered, and the functionality of the receivers and transmitters can be switched, e.g., T1 may be a receiver and R3 may be a transmitter.

Ports of the transmitting and receiving windings (shown as circles) may be electrically connected to transmitter and receiver boards (not shown) that cause the transmitters T1-T4 to generate signals and cause the receivers R1-RN to measure the current responses caused by the generated signals. In certain embodiments, one or more of the transmitters T1-T4 may generate a signal in a target, and each of the receivers R1-RN may separately measure the response of the target to the signal. In certain embodiments, the combinations of transmitters and receivers used to generate EM signals and measure current responses may be varied dynamically by a control unit coupled to the transmitters T1-T4 and receivers R1-RN. The number and size of the receiver pairs may determine the granularity and resolution of the measurements.

In certain embodiments, a downhole tool with conformable sensors may comprise a control system to control when and how the signals are transmitted and the responses are measured. The system 300 comprises a control unit 302 that may function as the primary controller for the tool and may be communicably coupled to transmitters 1-N through transmitter electronics 304, to receivers 1-M through receiver electronics 306, and to mechanical, electrical or hydraulic elements 330 coupled to and configured to extend pads to which the transmitters 1-N and receivers 1-M coupled. Other mechanical, electrical, or hydraulic element of the tool may also be coupled to the control unit 302. At least one of the transmitters 1-N and receivers 1-M may comprise elements of a conformable sensor or an array of conformable sensors. The transmitter electronics 304 and receiver electronics 306 may comprise circuit boards to which some or all of the transmitters 1-N and receivers 1-M are coupled.

The control unit 302 may trigger the transmitter electronics 304 to generate a time-varying EM signal through one or more of the transmitters 1-N. The time-varying signal may be a sinusoidal signal, its phase and amplitude set at a desired value. As is described above, the EM signals generated through the transmitters 1-N may be coupled to and generate eddy currents in the pipe or borehole that are in immediate contact with the conformable sensors, and the eddy currents may generate secondary currents that contain information about the pipe or borehole, including features of the pipe or borehole. The secondary currents generated by one or more of the transmitters 1-N of the conformable sensor array may be measured at the receivers 1-M. In the case of a frequency domain operation, the measurements from the receivers 1-M may be represented as voltage or current numbers in complex domain with real and imaginary parts, in phasor domain as amplitude and phase, or any other domain that can be obtained by analytical mapping from any of these domains. In the case of a time domain operation, the measurements from the receivers 1-M may be represented as magnitudes as a function of time which can be positive or negative. Results from time and frequency domain can be transferred from one to another by using Fourier transform or inverse Fourier transform.

The control unit 302 may receive the measurements from the receivers 1-N through the receiver electronics 306 and may transmit the measurements to the data acquisition unit 308. For a specific transmitter excitation, measurements from multiple receivers can be generated and received at the same time. Similarly, multiple transmitters 1-N can be excited at the same time and they can be time, frequency or jointly multiplexed for latter demultiplexing operation at the receivers. Upon reception at the data acquisition unit 308, the measurements may be digitized, stored in a data buffer 310, preprocessed at data processing unit 312, and sent to the surface 314 through a communication unit 316, which may comprise a downhole telemetry system.

In certain embodiments, the control unit 302 may further select the combinations of the transmitters and receivers to use to make measurements. The control unit 302 may comprise a set of instructions and may generate control signals to the transmitter and receiver electronics based, at least in part, on the instructions. For example, the control unit 302 may issue control signals to the transmitter and receivers to take different types of measurements within certain time periods or using different excitation frequencies. Example types of measurements include measurements with low-depth of investigations, medium depth of investigation, and high depth of investigation.

According to aspects of the present disclosure, the measurements from the conformable sensors of the downhole tool may be aggregated and processed to produce a visualization of the downhole elements surveyed or measured by the downhole tool and of the features of the downhole elements, including cracks or corrosion in a casing or fractures in a formation proximate the borehole. In certain embodiments, aggregating and processing the measurements may comprise aggregating and processing the measurements using a control unit located either within the downhole tool or the surface above the downhole tool. When processed at the surface, the measurements may be communicated to the surface in real time, such as through a wireline, or stored in a downhole tool and later processed when the tool is retrieved to the surface. In certain embodiments, aggregating and processing the measurements may comprise aggregating and processing the measurements using an inversion algorithm implemented as a set of instructions in the control unit that are executable by a processor of the control unit to perform data calculations and manipulations necessary for the inversion algorithm. The inversion algorithm may be specific to the environment in which the downhole tool is used (cased or open hole) and may be designed to calculate downhole parameters unique to the environment.

Figure 4:
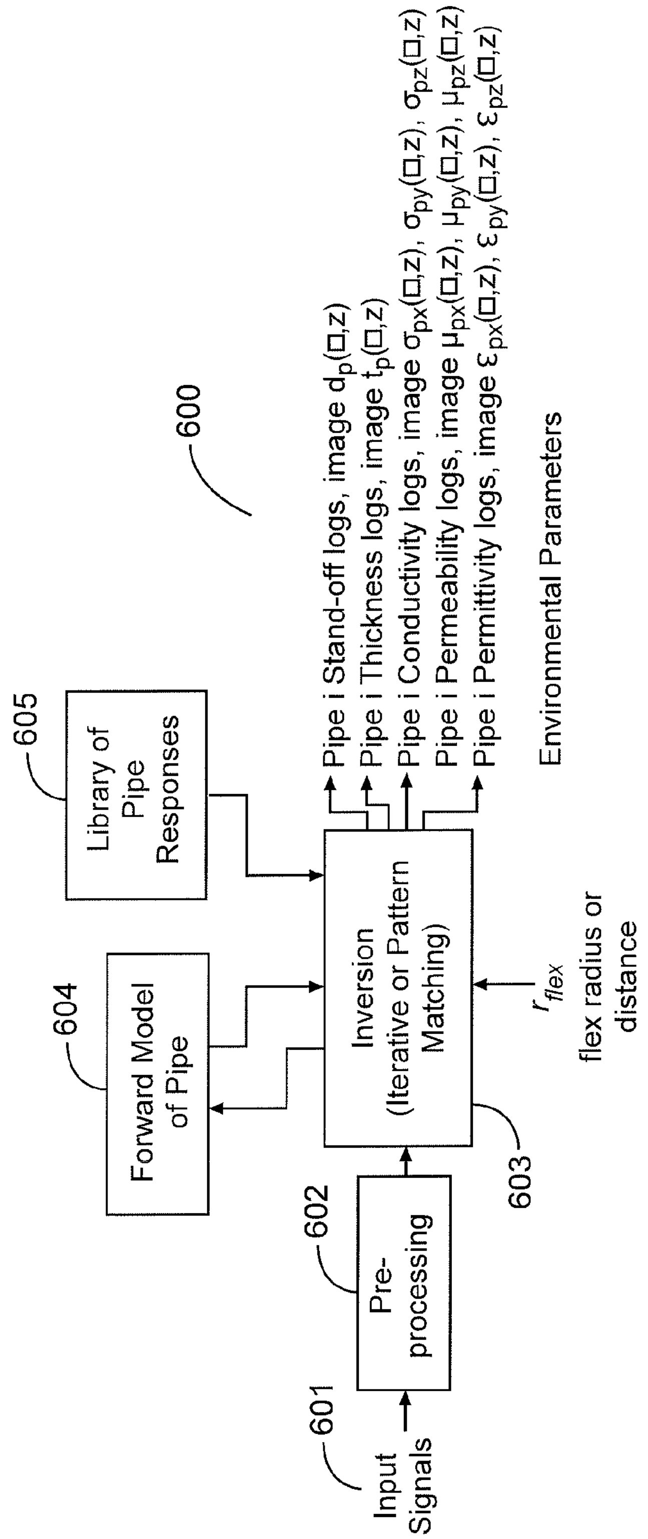
FIG. 4 is a block diagram showing an example inversion algorithm for measurements from a cased environment, according to aspects of the present disclosure.

FIG. 4 is a block diagram on an example inversion algorithm for a cased environment with one or more casings, according to aspects of the present disclosure. An input signal 401 may comprise measurements from the receivers of the downhole tool, including the receivers of the conformable sensor. In certain embodiments, the input signals may be divided into time components and may be identified by the receiver which made the measurement and the transmitter that generated the eddy current/secondary current measured by the receiver. The measurements may also be identified by the casing to which they correspond, when measurements on multiple casings are taken.

The inversion algorithm may comprise a pre-processing block 402, which may receive the input signals 401. The pre-processing block 402 may process the input signals to compensate for downhole conditions or to convert the input signals to a form usable within the inversion block 403. For example, the pre-processing block 402 may process the measurements to calibrate for temperature effects, convert between frequency to time domain, convert between complex-value to phase and amplitudes, and/or to remove noise by filtering in azimuth or depth.

The inversion algorithm further may comprise an inversion block 403, which may receive and process the signals from the pre-processing block 402 to identify parameters of the casings. In certain embodiments, the inversion block 403 may receive a model 404 of the casing or casings in which the downhole tool was disposed. The inversion block 403 may implement a cost function to identify parameters of the casing or casings that produce the minimum mismatch between the model 404 and the input signals 401. The cost function may be defined, for example, by utilizing least squares minimization through $L_2$ norm. The inversion block 403 may output the parameters of the casings.

In certain embodiments, a library 405 of casing responses from other casings and conformable sensors can be used instead of or in addition to the model 404. For example, the library 405 may be used if the parameter dimensions of the casing responses are low in number and also small in range, so that an accurate library can be calculated. If library 405 is used, a multi-dimensional interpolation can be used to obtain the parameters of the casing closest to the measurements.

The inversion block 403 may generate output including one or more parameters of the casings measured by the downhole tool. Example parameters include the stand-off distance between the sensors and the casing as well as the thickness, conductivity, permeability, and permittivity of the casing. The visualizations of the parameters may be used to identify features of the downhole elements. For example, a visualization of the conductivity of the pipe may show a variation in the conductivity where there is corrosion or a crack, and the shape of the variation in the visualization may identify the corresponding shape and orientation of the feature. Accordingly, by identifying variations in the parameter visualization, features of the downhole element may be identified and characterized.

Because of the resolution offered by the conformable sensors, very small changes in the pipe parameters corresponding to very small features (on the order of 0.1 inches) on the casing in direct contact with the conformable sensor can be identified and imaged. In a multi-casing environment, the image for each additional casing is of decreasing resolution due to the increasing stand-off of the casings to the transmitters and receivers of the conformable sensors.

In certain embodiments, the downhole tool may make measurements as it is lowered to different depths within the casing, collecting more data points. In certain embodiments, these points can be combined to form a log of the casing, providing an image of the entire casing, rather than one axial portion. Alternatively, discrete azimuthal measurements from each depth can be combined to obtain an image of the casing. In addition to the pipe parameters, certain environmental parameters, such as temperature, pipe stresses, eccentricity of the tool in the borehole or pipe can be obtained.

Figure 5:
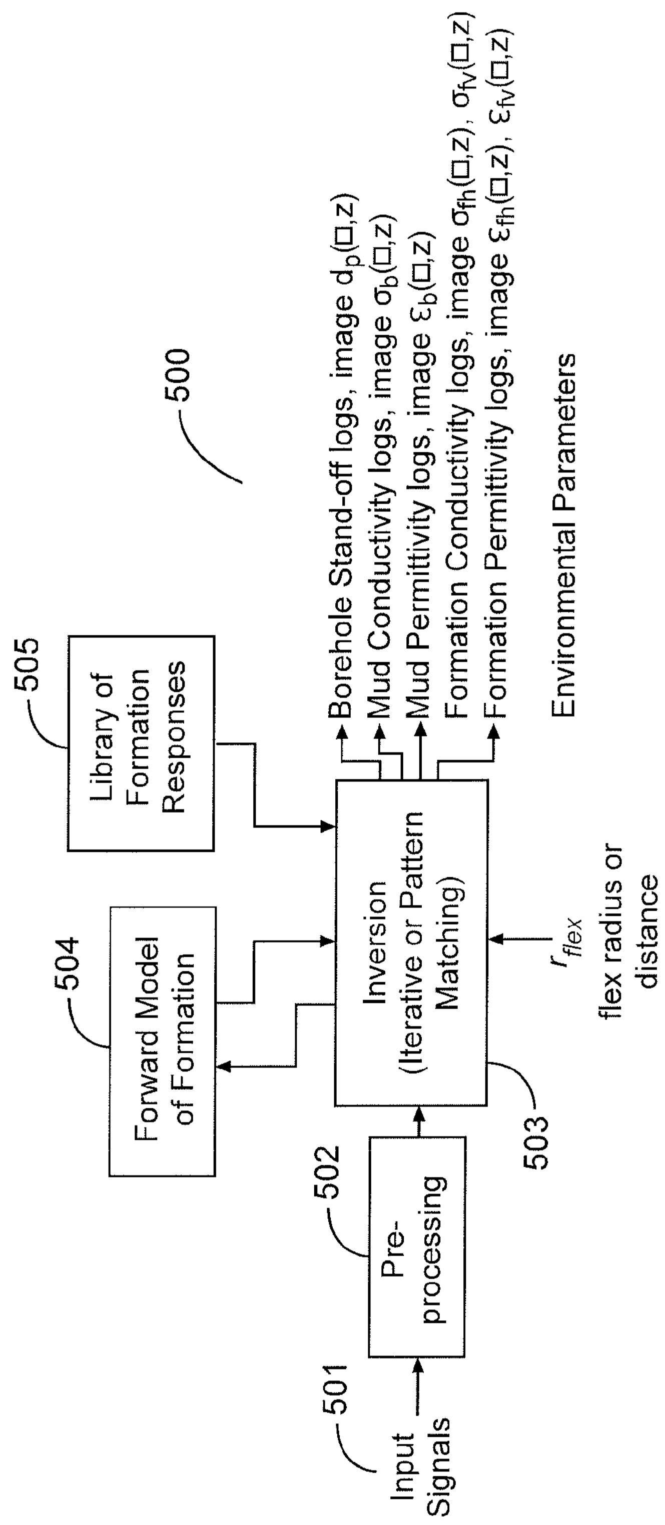
FIG. 5 is a block diagram showing an example inversion algorithm for measurements from an open hole environment, according to aspects of the present disclosure.

FIG. 5 is a block diagram on an example inversion algorithm for an open hole environment, according to aspects of the present disclosure. As can be seen, the inversion algorithm 500 comprises similar features to inversion algorithm 400. For example, the input signals 501 and pre-processing block 502 may be similar to those described with respect to FIG. 4. The inversion block 503 may also be similar, processing the input signals 501 using a model 504 or library 505, with the model 504 or library 505 corresponding to a borehole rather than a casing.

The inversion block 503 may output parameters specific to an open hole environment. For example, the parameters may include a stand-off distance between the conformable sensor and the borehole, mud conductivity and permittivity, and formation conductivity and permittivity. Shallow measurements made using the conformable sensors may be used to estimate the electrical properties of drilling fluid within the borehole, and also flushed zone and mud cake in the formation. In certain embodiments, larger sensors with lower resolution can be used to minimize the borehole rugosity effects. Like the inversion algorithm 400, the inversion algorithm 500 may output logs of parameters that may be visualized, and variations in the visualization can be used to identify and characterize features of the borehole.

In certain embodiments, it may be possible to generate visualizations based on some of the raw or processed signals from the conformable sensors in addition to visualizations based on the pipe or borehole parameters. For example, for frequency domain measurements from the conformable sensors, the amplitude or phase of the received signals can be plotted as a function of azimuth and depth to generate a 2D image of signals. For time domain results, the magnitude of the measurements from the conformable sensors at a certain times may be plotted as a function of azimuth and depth as 2D images. For time-domain, the measurements from the conformable sensors also may be plotted at a certain azimuth as a function of time and depth, to produce a different 2D image. This time-domain visualization may help differentiate shallow features from deep features, since shallow features are typically related to early time signal, and deep features are related to late time signals.

Figure 9:
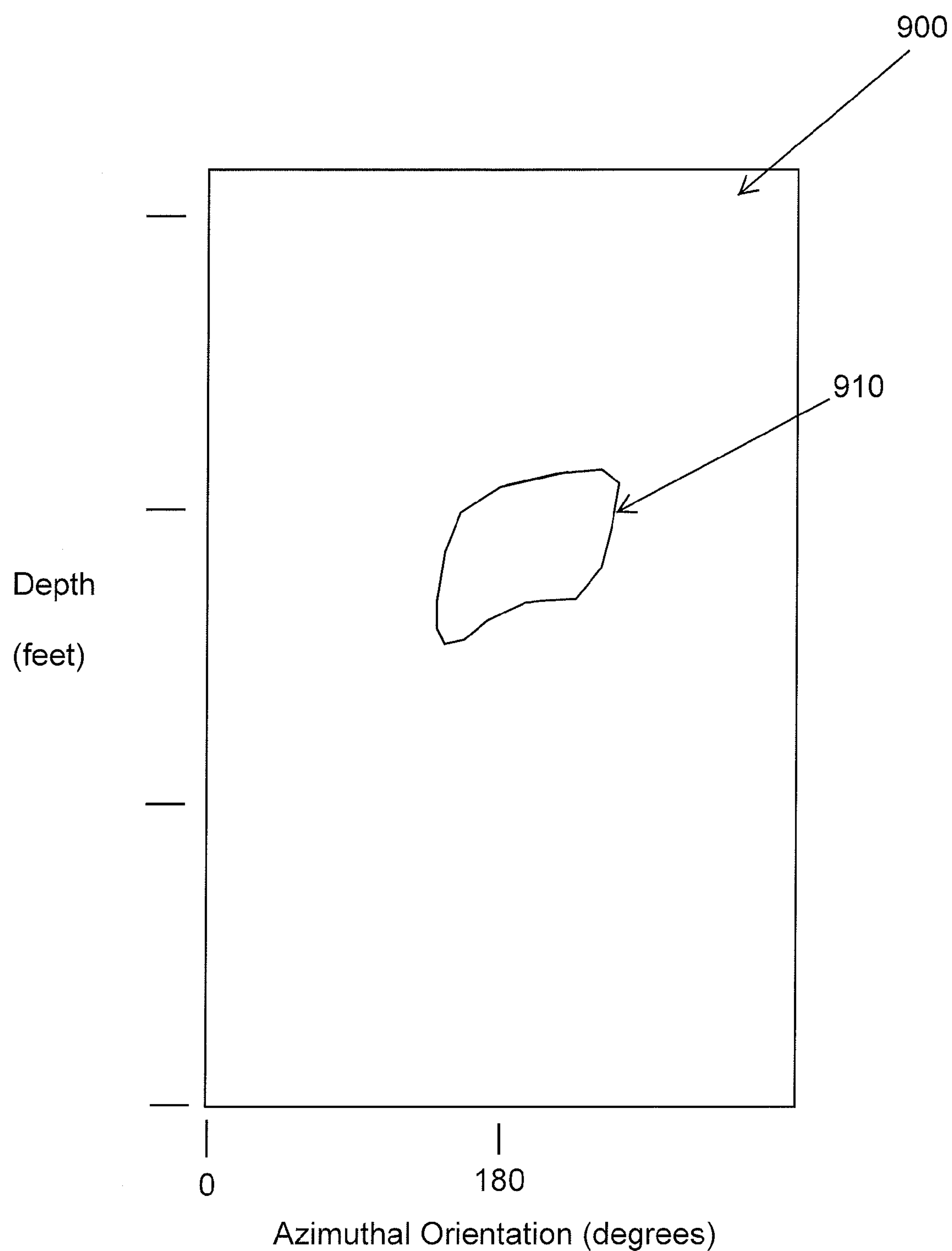
FIG. 9 is a diagram showing an example visualization, according to aspects of the present disclosure.

FIG. 9 is a diagram showing an example visualization 900, according to aspects of the present disclosure. As can be seen, the example visualization 900 may comprise a graph in which one axis correspond to the azimuthal orientation of a casing or borehole with respect to the tool, and the other axis corresponds to the distance or depth of the tool with respect to the surface. In the embodiment shown, the visualization 900 identifies an area of corrosion 910 on a downhole casing. Similar visualizations may identify other areas of interest on downhole casing or tubing, as well as fractures within a borehole wall. In certain embodiments, the visualization 900 may comprise color gradients or other three dimensional aspects that identify a third dimension of the area of interest, such as thickness or depth with respect to the axis of the downhole tool.

Additionally, since different transmitter-receiver pairs are sensitive to different spatial zones with differing depths of investigation and resolution, each image generated by the conformable sensor can give different information about the pipe or borehole. For example, images that are constructed from distant transmitter and receivers may have very large depths of investigation that measure responses of casings outside of the casing in contact with the conformable sensor. On the other hand, transmitter and receiver pairs with small separation produce high resolution but shallow images. Similarly, transmitter receiver pairs that are oriented in a certain direction are sensitive to anisotropy in the transverse directions.

According to certain aspects of the present disclosure, changes in the features of the downhole elements may be identified by determining a baseline visualization and manually or automatically identifying changes in subsequent visualizations. For example, the baseline visualization may correspond to a non-corroded section of a pipe, or a smooth section of the borehole with no fractures. The raw, processed, or inversion results at the baseline depth can be subtracted from some other depths to yield a relative or difference log or image. The difference image can enhance visualization of features that create deviations from the baseline, such as cracks on pipe or fractures on the borehole. Multiple baselines can be selected for different sections of the log or image. In order to speed up logging operation, azimuthal measurements can be made only if non-azimuthal measurements show changes with respect to the baseline of the signal.

Figure 6:
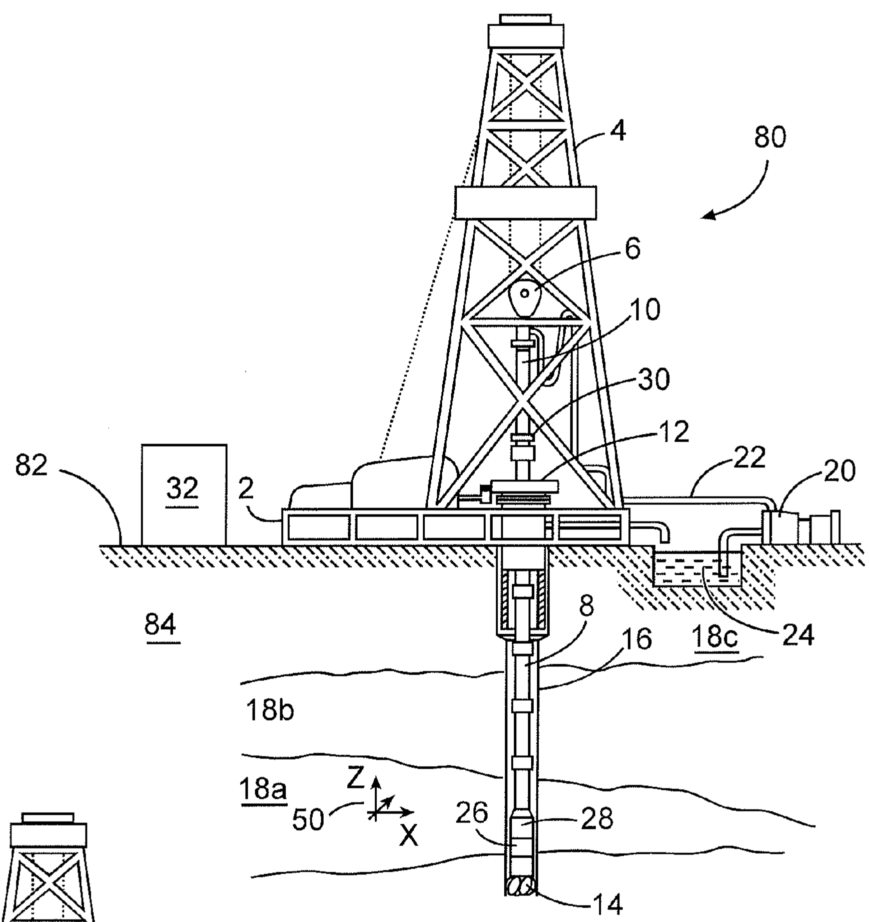
FIG. 6 is a diagram showing illustrative logging while drilling environment, according to aspects of the present disclosure.

FIG. 6 is a diagram showing a subterranean drilling system 80 incorporating a downhole tool 26 with at least one conformable sensor, similar to the example downhole tools described above. The drilling system 80 comprises a drilling platform 2 positioned at the surface 82. In the embodiment shown, the surface 82 comprises the top of a formation 84 containing one or more rock strata or layers 18*a-c*, and the drilling platform 2 may be in contact with the surface 82. In other embodiments, such as in an off-shore drilling operation, the surface 82 may be separated from the drilling platform 2 by a volume of water.

The drilling system 80 comprises a derrick 4 supported by the drilling platform 2 and having a traveling block 6 for raising and lowering a drill string 8. A kelly 10 may support the drill string 8 as it is lowered through a rotary table 12. A drill bit 14 may be coupled to the drill string 8 and driven by a downhole motor and/or rotation of the drill string 8 by the rotary table 12. As bit 14 rotates, it creates a borehole 16 that passes through one or more rock strata or layers 18. A pump 20 may circulate drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole 16 into the pit 24 and aids in maintaining integrity or the borehole 16.

The drilling system 80 may comprise a bottom hole assembly (BHA) coupled to the drill string 8 near the drill bit 14. The BHA may comprise various downhole measurement tools and sensors and LWD and MWD elements, including the downhole tool 26 with at least one conformable sensor. As the bit extends the borehole 16 through the formations 18, the tool 26 may collect measurements relating to borehole 16 and the formation 84. In certain embodiments, the orientation and position of the tool 26 may be tracked using, for example, an azimuthal orientation indicator, which may include magnetometers, inclinometers, and/or accelerometers, though other sensor types such as gyroscopes may be used in some embodiments.

The tools and sensors of the BHA including the tool 26 may be communicably coupled to a telemetry element 28. The telemetry element 28 may transfer measurements from tool 26 to a surface receiver 30 and/or to receive commands from the surface receiver 30. The telemetry element 28 may comprise a mud pulse telemetry system, and acoustic telemetry system, a wired communications system, a wireless communications system, or any other type of communications system that would be appreciated by one of ordinary skill in the art in view of this disclosure. In certain embodiments, some or all of the measurements taken at the tool 26 may also be stored within the tool 26 or the telemetry element 28 for later retrieval at the surface 82.

In certain embodiments, the drilling system 80 may comprise a surface control unit 32 positioned at the surface 102. The surface control unit 32 may be communicably coupled to the surface receiver 30 and may receive measurements from the tool 26 and/or transmit commands to the tool 26 though the surface receiver 30. The surface control unit 32 may also receive measurements from the tool 26 when the tool 26 is retrieved at the surface 102. As is described above, the surface control unit 32 may process some or all of the measurements from the tool 26 to determine certain parameters of downhole elements, including the borehole 16 and formation 84, and may also generate visualizations of the borehole 16 and formation 84 based, at least in part, on the determined parameters through which features of the downhole elements, such as cracks and fractures, may be identified.

Figure 7:
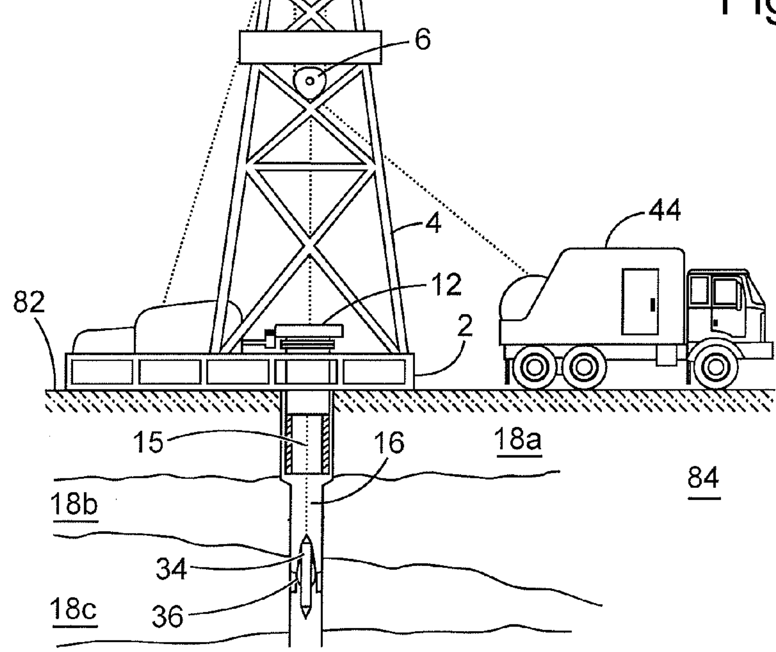
FIG. 7 is a diagram showing an illustrative wireline logging environment, according to aspects of the present disclosure.

At various times during the drilling process, the drill string 8 may be removed from the borehole 16 as shown in FIG. 7. Once the drill string 8 has been removed, measurement/logging operations can be conducted using a wireline tool 34, e.g., an instrument that is suspended into the borehole 16 by a cable 15 having conductors for transporting power to the tool and telemetry from the tool body to the surface 102. The wireline tool 34 may comprise a downhole tool 36 with at least one conformable sensor, similar to the tool 26 described above. The tool 36 may be communicatively coupled to the cable 15. A logging facility 44 (shown in FIG. 8 as a truck, although it may be any other structure) may collect measurements from the tool 36, and may include computing facilities (including, e.g., a control unit/information handling system) for controlling, processing, storing, and/or visualizing the measurements gathered by the tool 36. The computing facilities may be communicatively coupled to the tool 36 by way of the cable 15. In certain embodiments, the control unit 32 may serve as the computing facilities of the logging facility 44.

An example method for downhole surveying and measuring may include receiving a measurement from a receiver of a conformable sensor, the measurement corresponding to a response of a downhole element to an electromagnetic signal generated by a transmitter of the conformable sensor. A parameter of the downhole element may be determined based, at least in part, on the received measurement. A visualization of a feature of the downhole element may be generated based, at least in part, on at least one of the received measurement and the determined parameter. In certain embodiments, generating the visualization of the feature of the downhole element comprises generating a visualization of a fracture in a formation proximate a borehole within a subterranean formation. In certain embodiments, generating the visualization of the feature of the downhole element comprises generating a visualization of at least one of crack or fracture in a casing within a borehole in a subterranean formation, or corrosion on a surface of the casing.

In any of the embodiments described in the preceding paragraph, determining the parameter of the downhole element based, at least in part, on the received measurement may comprise processing received measurement using an inversion algorithm to determine the parameter. In certain embodiments, the parameter comprises at least one of conductivity, permittivity, thickness, and permeability of the downhole element.

In certain embodiments, the received measurement comprises measurements corresponding to responses of the downhole element at a plurality of different axial and azimuthal positions. In certain embodiments, generating the visualization of the feature of the downhole element comprises generating a visualization of the downhole element based, at least in part, on the measurements from the plurality of different axial and azimuthal positions of the downhole element. In certain embodiments, the received measurement comprises at least one of measurements corresponding to responses of the downhole element over a plurality of time periods, and measurements corresponding to responses of the downhole element over a plurality of frequencies. In certain embodiments, generating the visualization of the feature of the downhole element comprises at least one of generating at least two visualizations of the feature corresponding at least two time periods of the plurality of time periods, and generating at least two visualizations of the feature corresponding at least two frequencies of the plurality of frequencies. In certain embodiments, generating the visualization of the feature of the downhole element comprises at least one of generating a visualization of a change in the feature between two time periods, and generating a visualization of a change in the feature between two frequencies.

According to aspects of the present disclosure, an example system for downhole surveying and measuring comprises a downhole tool and a first conformable sensor coupled to the tool body. The first conformable sensor may comprise a flexible material, a transmitter coupled to the flexible material, and a receiver coupled to the flexible material. The downhole tool may further comprise a processor coupled to a memory device, the memory device containing a set of instructions that, when executed by the processor, cause the processor to receive a measurement from the receiver corresponding to a response of a downhole element to an electromagnetic signal generated by the transmitter of the conformable sensor, determine a parameter of the downhole element based, at least in part, on the received measurement, and generate a visualization of a feature of the downhole element based, at least in part, on at least one of the received measurement and the determined parameter. In certain embodiments, the set of instructions that cause the processor to generate the visualization of the feature of the downhole element further cause the processor to generate a visualization of a fracture in a formation proximate a borehole within a subterranean formation. In certain embodiments, the set of instructions that cause the processor to generate the visualization of the feature of the downhole element further cause the processor to generate a visualization of at least one of crack or fracture in a casing within a borehole in a subterranean formation, or corrosion on a surface of the casing.

In any of the embodiments described in the preceding paragraph, the set of instructions that cause the processor to determine the parameter of the downhole element based, at least in part, on the received measurement may further cause the processor to process received measurement using an inversion algorithm to determine the parameter.

In certain embodiments, the parameter comprises at least one of conductivity, permittivity, thickness, and permeability of the downhole element. In certain embodiments, In certain embodiments, the received measurement comprises measurements corresponding to responses of the downhole element at a plurality of different axial and azimuthal positions. In certain embodiments, the set of instructions that cause the processor to generate the visualization of the feature of the downhole element further causes the processor to generate a visualization of the downhole element based, at least in part, on the measurements from the plurality of different axial and azimuthal positions of the downhole element. In certain embodiments, the received measurement comprises at least one of measurements corresponding to responses of the downhole element over a plurality of time periods; and measurements corresponding to responses of the downhole element over a plurality of frequencies. In certain embodiments, the set of instructions that causes the processor to generate the visualization of the feature of the downhole element further causes the processor to at least one of generate at least two visualizations of the feature corresponding at least two time periods of the plurality of time periods; and generate at least two visualizations of the feature corresponding at least two frequencies of the plurality of frequencies. In certain embodiments, the set of instructions that causes the processor to generate the visualization of the feature of the downhole element further causes the processor to at least one of generate a visualization of a change in the feature between two time periods and generate a visualization of a change in the feature between two frequencies.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee. The indefinite articles "a" or "an," as used in the claims, are each defined herein to mean one or more than one of the element that it introduces.

What is claimed is:

1. A method for downhole surveying and measuring, comprising receiving a measurement from a receiver of a conformable sensor extended from a tool body such that the conformable sensor contacts a downhole element by deforming to a shape of the downhole element, the measurement corresponding to a response of a downhole element to an electromagnetic signal generated by a transmitter of the conformable sensor;

determining a parameter of the downhole element based, at least in part, on the received measurement; and generating a visualization of a feature of the downhole element based, at least in part, on at least one of the received measurement and the determined parameter.

2. The method of claim 1, wherein generating the visualization of the feature of the downhole element comprises generating a visualization of a fracture in a formation proximate a borehole within a subterranean formation.

3. The method of claim 1, wherein generating the visualization of the feature of the downhole element comprises generating a visualization of at least one of crack or fracture in a casing within a borehole in a subterranean formation, or corrosion on a surface of the casing.

4. The method of claim 1, wherein determining the parameter of the downhole element based, at least in part, on the received measurement comprises processing received measurement using an inversion algorithm to determine the parameter.

5. The method of claim 4, wherein the parameter comprises at least one of conductivity, permittivity, thickness, and permeability of the downhole element.

6. The method of claim 1, wherein the received measurement comprises measurements corresponding to responses of the downhole element at a plurality of different axial and azimuthal positions.

7. The method of claim 1, wherein generating the visualization of the feature of the downhole element comprises generating a visualization of the downhole element based, at least in part, on the measurements from the plurality of different axial and azimuthal positions of the downhole element.

8. The method of claim 1, wherein the received measurement comprises at least one of measurements corresponding to responses of the downhole element over a plurality of time periods; and measurements corresponding to responses of the downhole element over a plurality of frequencies.

9. The method of claim 8, wherein generating the visualization of the feature of the downhole element comprises at least one of generating at least two visualizations of the feature corresponding at least two time periods of the plurality of time periods; and generating at least two visualizations of the feature corresponding at least two frequencies of the plurality of frequencies.

10. The method of claim 8, wherein generating the visualization of the feature of the downhole element comprises at least one of generating a visualization of a change in the feature between two time periods; and generating a visualization of a change in the feature between two frequencies.

11. A system for downhole surveying and measuring, comprising a downhole tool, an extendable arm coupled to the downhole tool;

a first conformable sensor coupled to the extendable arm of the downhole tool, wherein the first conformable sensor deforms to a shape of a downhole element based on a tension of the extendable arm, and wherein the first conformable sensor comprises:

a flexible material;

a transmitter coupled to the flexible material; and a receiver coupled to the flexible material;

a processor coupled to a memory device, the memory device containing a set of instructions that, when executed by the processor, cause the processor to:

receive a measurement from the receiver corresponding to a response of a downhole element to an electromagnetic signal generated by the transmitter of the conformable sensor;

determine a parameter of the downhole element based, at least in part, on the received measurement; and generate a visualization of a feature of the downhole element based, at least in part, on at least one of the received measurement and the determined parameter.

12. The system of claim 11, wherein the set of instructions that cause the processor to generate the visualization of the feature of the downhole element further cause the processor to generate a visualization of a fracture in a formation proximate a borehole within a subterranean formation.

13. The system of claim 11, wherein the set of instructions that cause the processor to generate the visualization of the feature of the downhole element further cause the processor to generate a visualization of at least one of crack or fracture in a casing within a borehole in a subterranean formation, or corrosion on a surface of the casing.

14. The system of claim 11, wherein the set of instructions that cause the processor to determine the parameter of the downhole element based, at least in part, on the received measurement further cause the processor to process received measurement using an inversion algorithm to determine the parameter.

15. The system of claim 14, wherein the parameter comprises at least one of conductivity, permittivity, thickness, and permeability of the downhole element.

16. The system of claim 11, wherein the received measurement comprises measurements corresponding to responses of the downhole element at a plurality of different axial and azimuthal positions.

17. The system of claim 11, wherein the set of instructions that cause the processor to generate the visualization of the feature of the downhole element further causes the processor to generate a visualization of the downhole element based, at least in part, on the measurements from the plurality of different axial and azimuthal positions of the downhole element.

18. The system of claim 11, wherein the received measurement comprises at least one of measurements corresponding to responses of the downhole element over a plurality of time periods; and measurements corresponding to responses of the downhole element over a plurality of frequencies.

19. The system of claim 18, wherein the set of instructions that causes the processor to generate the visualization of the feature of the downhole element further causes the processor to at least one of generate at least two visualizations of the feature corresponding at least two time periods of the plurality of time periods; and generate at least two visualizations of the feature corresponding at least two frequencies of the plurality of frequencies.

20. The system of claim 18, wherein the set of instructions that causes the processor to generate the visualization of the feature of the downhole element further causes the processor to at least one of generate a visualization of a change in the feature between two time periods; and generate a visualization of a change in the feature between two frequencies.

* * * * *